(12) United States Patent
Brentano et al.

(10) Patent No.: US 12,051,222 B2
(45) Date of Patent: Jul. 30, 2024

(54) CAMERA CALIBRATION FOR FEEDING BEHAVIOR MONITORING

(71) Applicant: X Development LLC, Mountain View, CA (US)

(72) Inventors: Grace Taixi Brentano, Redwood City, CA (US); Barnaby John James, Campbell, CA (US); Laura Valentine Chrobak, Menlo Park, CA (US); Zhaoying Yao, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 333 days.

(21) Appl. No.: 17/374,257

(22) Filed: Jul. 13, 2021

(65) Prior Publication Data

US 2023/0017422 A1 Jan. 19, 2023

(51) Int. Cl.
*G06T 7/80* (2017.01)
*A01K 61/10* (2017.01)
*A01K 61/85* (2017.01)
*A01K 61/90* (2017.01)

(52) U.S. Cl.
CPC ............... *G06T 7/80* (2017.01); *A01K 61/85* (2017.01); *A01K 61/90* (2017.01); *A01K 61/10* (2017.01); *G06T 2207/30242* (2013.01)

(58) Field of Classification Search
CPC ... G06T 7/80; G06T 2207/30242; A01K 6/90; A01K 61/85; A01K 61/10
See application file for complete search history.

(56) References Cited

U.S. PATENT DOCUMENTS

| | | |
|---|---|---|
| 10,856,520 B1 | 12/2020 | Kozachenok et al. |
| 2017/0150701 A1 | 6/2017 | Gilmore et al. |
| 2019/0228218 A1 | 7/2019 | Barnaby et al. |
| 2019/0277624 A1 | 9/2019 | Kitagawa et al. |
| 2019/0340440 A1 | 11/2019 | Atwater et al. |
| 2020/0107524 A1 | 4/2020 | Messana et al. |
| 2020/0155882 A1 | 5/2020 | Tohidi et al. |

(Continued)

FOREIGN PATENT DOCUMENTS

| | | |
|---|---|---|
| CL | 2019000039 A1 | 3/2019 |
| CN | 108040948 | 5/2018 |

(Continued)

OTHER PUBLICATIONS

Maloy et al., "A spatio-temporal recurrent network for salmon feeding action recognition from underwater videos in aquaculture," Computers and Electronics in Agriculture, Nov. 12, 2019, 9 pages.

(Continued)

*Primary Examiner* — David Perlman
(74) *Attorney, Agent, or Firm* — Fish & Richardson P.C.

(57) ABSTRACT

In one aspect, there is provided a method that includes receiving, by a control system having (i) a first camera configured to obtain an image of a scene, (ii) a winch controller, and (iii) a feeding system configured to deliver a feed to aquaculture, instructions to initiate a calibration of the first camera, determining a calibration state of the first camera, determining a sequence of calibration steps based on the calibration state of the first camera, and executing the sequence of calibration steps to calibrate the first camera.

14 Claims, 5 Drawing Sheets

(56) References Cited

U.S. PATENT DOCUMENTS

| | | | |
|---|---|---|---|
| 2020/0184206 A1 | 6/2020 | Barnaby et al. | |
| 2020/0288678 A1 | 9/2020 | Howe et al. | |
| 2021/0045364 A1* | 2/2021 | Huang | A01K 61/85 |
| 2021/0080715 A1* | 3/2021 | Saxena | A01K 29/005 |
| 2021/0142052 A1 | 5/2021 | Barnaby et al. | |

FOREIGN PATENT DOCUMENTS

| | | |
|---|---|---|
| EP | 2244934 | 11/2010 |
| EP | 3484283 | 5/2019 |
| JP | 2002171853 | 6/2002 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming," E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

Extended Search Report in European Appln. No. 22151132.2, dated May 2, 2022, 10 pages.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

International Search Report and Written Opinion in International Appln. No. PCT/US2020/059829, dated Feb. 25, 2021, 18 pages.

International Search Report and Written Opinion in International Appln. No. PCT/US2022/032627, dated Sep. 14, 2022, 14 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, arXiv:1902.10847v1, 12 pages.

Qiu et al., "Improving Transfer Learning and Squeeze-and-Excitation Networks for Small-Scale Fine-Grained Fish Image Classification," IEEE Access, Dec. 2018, 6(31):78503-78512.

Stein et al., "Consistent melanophore spot patterns allow long-term individual recognition of Atlantic salmon *Salmo salar*," Journal of Fish Biology, Nov. 2017, 91(6):1699-1712.

International Preliminary Report on Patentability in International Appln. No. PCT/US2022/032627, dated Jan. 25, 2024, 8 pages.

* cited by examiner

CAMERA CALIBRATION FOR FEEDING BEHAVIOR MONITORING

TECHNICAL FIELD

This specification relates to aquaculture systems, and more specifically, to camera calibration for feeding behavior monitoring.

BACKGROUND

Aquaculture refers to the breeding, rearing, and harvesting of animals and plants in all types of water environments under controlled conditions. One of the methods of aquaculture involves aquafarming, which is fish farming in tanks or ocean enclosures.

Offshore aquafarms can include feeding systems that introduce feed into the enclosure under the water surface. Monitoring the feeding behavior of fish in the ocean can be important to determine the amount of feed that is being consumed by the fish, and to modify the feeding regimen accordingly.

However, monitoring the feeding behavior offshore can pose significant challenges due to variable weather conditions and strong ocean currents that may arise. For effective feeding observation, submerged monitoring equipment may need to be appropriately positioned with respect to the feeding location. Furthermore, monitoring the feeding behavior can be excessively labor intensive, e.g., the process typically requires observing multiple screens (4-8 screens) over long periods of time (6-8 hours).

Accordingly, there exists a growing need for systems and methods that would enable feeding behavior monitoring under the water surface in an effective and safe manner.

SUMMARY

This specification describes a method for calibrating a camera for feeding behavior monitoring. More particularly, implementations of the present disclosure can efficiently calibrate the camera underwater according to a sequence of calibration steps associated with a calibration state of the camera. Furthermore, the method described in this specification can calibrate the camera for monitoring the feeding behavior of land animals such as, e.g., cattle, in agricultural settings.

According to a first aspect, there is provided a method that includes receiving, by a control system having (i) a first camera configured to obtain an image of a scene, (ii) a winch controller, and (iii) a feeding system configured to deliver a feed to aquaculture, instructions to initiate a calibration of the first camera, determining a calibration state of the first camera, determining a sequence of calibration steps based on the calibration state of the first camera, and executing the sequence of calibration steps to calibrate the first camera.

In some implementations, the first camera is initially uncalibrated and the calibration state is a warm calibration state.

In some implementations, the sequence of calibration steps associated with the warm calibration state includes determining an estimated calibration position, determining a first range based on the estimated calibration position, moving, by the winch controller, the first camera across the first range at a first speed, obtaining, by the first camera, the image of the scene, and determining, based on the image of the scene obtained by the first camera, whether the feed delivered by the feeding system is above a threshold.

In some implementations, the image of the scene obtained by the first camera includes at least one frame, and the threshold specifies a count of the feed detected in the at least one frame.

In some implementations, the control system further includes a second camera configured to obtain the image of the scene, and the threshold specifies an aggregate of (i) a first count of feed detected in the image of the scene obtained by the first camera and (ii) a second count of feed detected in the image of the scene obtained by the second camera.

In some implementations, the method further includes determining based on the image of the scene obtained by the first camera that the feed delivered by the feeding system is above the threshold, and determining that the first camera is calibrated successfully.

In some implementations, the method further includes determining, from the image of the scene obtained by the first camera that the feed delivered by the feeding system is below the threshold, and determining that the calibration state is a fast-full calibration state.

In some implementations, the calibration state is a fast-full calibration state, and the sequence of calibration steps associated with the fast-full calibration state includes determining a second range based on a first range associated with a warm calibration state, where the second range is larger than the first range, moving, by the winch controller, the first camera across the second range at a first speed, obtaining, by the first camera, the image of the scene, and determining, based on the image of the scene obtained by the first camera, whether the feed delivered by the feeding system is above a threshold.

In some implementations, the method further includes determining based on the image of the scene obtained by the first camera that the feed delivered by the feeding system is above the threshold, and determining that the first camera is calibrated successfully.

In some implementations, the method further includes determining, from the image of the scene obtained by the first camera, that the feed delivered by the feeding system is below the threshold, and determining that the calibration state is a slow-full calibration state.

In some implementations, the calibration state is a slow-full calibration state, and the sequence of calibration steps associated with the slow-full calibration state includes moving, by the winch controller, the first camera across a second range at a second speed, where the second range is associated with a fast-full calibration state, and where the second speed is slower than a first speed associated with the fast-full calibration state, obtaining, by the first camera, the image of the scene, and determining, based on the image of the scene obtained by the first camera, whether the feed delivered by the feeding system is above a threshold.

In some implementations, the method further includes determining based on the image of the scene obtained by the first camera that the feed delivered by the feeding system is above the threshold, and determining that the first camera is calibrated successfully.

According to a second aspect, there are provided one or more non-transitory computer storage media storing instructions that, when executed by one or more computers, cause the one or more computers to perform operations of the method of any preceding aspect.

According to a third aspect, there is provided a system including one or more computers, and one or more storage devices communicatively coupled to the one or more computers, where the one or more storage devices store instructions that, when executed by the one or more computers, cause the one or more computers to perform the operations of the method of any preceding aspect.

Implementations of the present disclosure provide one or more of the following technical advantages and improvements over previously available solutions.

Appropriately calibrating the camera for feeding behavior monitoring can provide more accurate determination of feeding behavior and can increase the efficiency and sustainability of aquafarming. For example, calibration can ensure that a camera is optimally positioned to capture images from which the feeding behavior of fish can be discerned. Accordingly, the feeding regimen can be appropriately modified so as to decrease feed wastage and improve growth yield.

The calibration system for feeding behavior monitoring can obtain images of feed (e.g., pellets) and determine appropriate positioning of the camera on this basis. For example, the camera can be controlled such that the pellets appear in the field of view of the camera, and a position of the camera can be determined such that it is located proximally to the feeding location, e.g., at a location that contains the largest number of pellets. Accordingly, the camera can be calibrated to facilitate effective feeding behavior monitoring.

Furthermore, the systems described in this specification can determine the sequence of calibration steps for calibrating the camera based on a particular state of the camera. Some states can enable calibrating the camera more efficiently than other states. Therefore, by sequentially performing the calibration steps (e.g., with the first steps being more efficient than consequent steps), the systems described in this specification can not only calibrate the camera in an efficient manner so as to provide more accurate determination of the feeding behavior, but also ensure that the camera can be calibrated at all under any environmental and weather conditions, e.g., in strong winds and ocean currents.

BRIEF DESCRIPTION OF THE DRAWINGS

Like reference symbols in the various drawings indicate like elements.

DETAILED DESCRIPTION

Figure 1:
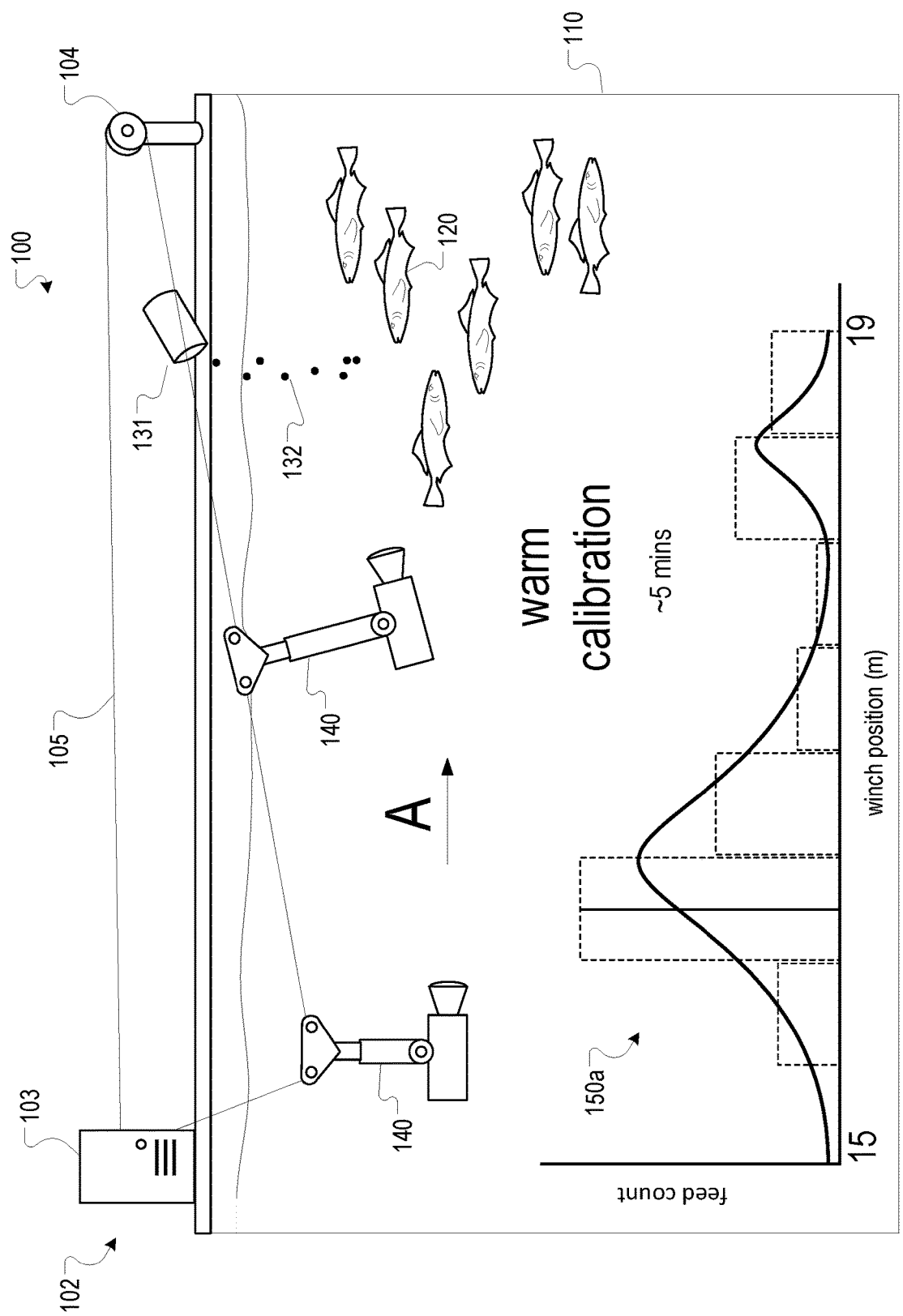
FIG. 1 illustrates an example of calibrating a camera in a warm calibration state.

FIG. 1 is an example camera calibration system 100 and an enclosure 110 that contains aquatic livestock (e.g., aquaculture). The livestock can be aquatic creatures, such as fish 120 swimming freely within the confines of the enclosure 110. In some implementations, the aquatic livestock 120 can include finfish, juvenile fish, koi fish, sharks, salmon, bass, and others. In addition to the aquatic livestock, the enclosure 110 can contain water, e.g., seawater, freshwater, or rainwater, although the enclosure can contain any fluid that is capable of sustaining a habitable environment for the aquatic livestock. In some implementations, the enclosure 110 and the camera calibration system 100 can be provided in an agricultural setting on land, and the enclosure 110 can include land animals such as, e.g., cattle. In other words, the systems described in this specification can efficiently calibrate a camera for feeding behavior monitoring of aquatic livestock in aquaculture, and any other appropriate livestock, e.g., land animals in agriculture.

In the aquatic setting, the camera calibration system 100 can be anchored to a structure such as a pier, a dock, or a buoy, instead of being confined within the enclosure 110. For example, instead of being confined within the enclosure 110, the fish 120 can be free to roam in a body of water, and the camera calibration system 100 can monitor fish within a certain area of the body of water. In the agricultural setting, the camera calibration system 100 can be anchored to any appropriate structure configured such that the system 100 can perform the operations described below.

The camera calibration system 100 can further include a feeding system 131 that delivers feed 132 to the fish 120. The feeding system 131 can be any appropriate feeding system. For example, the feeding system 131 can deliver a feed (e.g., feeding pellets) to the fish 120 through a subfeeder that can be disposed at a depth (e.g., 8 meters) from the surface of the water. The subfeeder is a structure including a main pipe that is connected to multiple manifold pipes. The feeding pellets 132 can travel from the main pipe through each of the manifold pipes disposed across the perimeter of the subfeeder, exit the pipes underwater and spread so as to be consumed by the fish 120. Other configurations of the subfeeder and/or the feeding system 131 are also possible.

The camera calibration system 100 can further include a camera 140 that can monitor the feeding behavior of fish 120. The camera 140 can capture image and/or video data. In place of the camera 140, any other device, or combination of devices, can be provided that are capable of capturing image and video data. The camera 140 can be coupled to a winch system 102 that can include a winch controller 103, one or more winch lines 105 on which the camera 140 is suspended, and one or more winches 104 coupled to the winch line 105.

The winch system 102 can further include one or more motors, one or more power supplies, and one or more pulleys to which the winch line 105 is attached. The winch controller 130 can also fix the position (or a viewing angle) of the camera 140 at a predetermined position with respect to the feeding system 131. In response to a command received by the winch controller 103, the winch system 102 can engage one or more motors to move the winch line 105, and the suspended camera 140, in x, y, and z directions, to a position dictated by the command. Further, the winch system 102 can tilt the camera 140 to alter the viewing angle of the camera 140. In some implementations, the feeding system 131 can be coupled to the one or more winches 104, one or more winch lines 105, and the winch controller 103. A position of the camera 140 can be estimated based on a length of the one or more winch lines 105 spooled out by the one or more winches 104.

The calibration of the camera 140 is important for effective feeding behavior monitoring. For example, in order to determine, e.g., the number and/or the rate of consumption of the pellets 132 by the fish 120, the pellets 132 need to be at least partially or temporarily visible in the field of view of the camera 140. However, due to variable weather conditions and environmental factors under water, the positioning of the camera 140 for effective feeding behavior monitoring can vary significantly. For example, because of the external forces from currents, wind, and waves, the pellets 132 can drift under water, the position of the feeding system 131 can shift, or otherwise move, such that the location at which the pellets 132 are delivered to the fish 120 can dynamically vary. Furthermore, the points at which the pellets 132 are delivered can also depend on the overall configuration of the feeding system 131. Accordingly, for effective feeding behavior monitoring, it is necessary to calibrate the camera 140, e.g., to find a position of the camera 140 that enables the detection of feeding pellets 132 in the field of view of the camera 140.

As described above, the camera 140 can capture image and/or video data of a scene underwater and is movable on the winch line 105 from a first position to a second position, e.g., across a particular distance/range, at a particular speed. The systems described in this specification can determine whether the camera 140 is calibrated successfully based on the image of the scene obtained by the camera 140. For example, the systems can move the camera 140 from the first position to the second position while capturing one, or multiple, images (e.g., one, or multiple, frames), and determine whether the count of pellets 132 detected in each frame is above a particular threshold (e.g., 0.5 pellets, 1 pellet, 10 pellets, 100 pellets, or any other appropriate number of pellets). In some implementations, the threshold can be specified according to a particular season, environment, feeding system, type of aquaculture, or in any other appropriate manner.

If the systems determine that the count of pellets 132 is above the threshold in a frame captured by the camera 140, the systems can thereby determine that the position on the winch line 105 at which the respective frame was captured by the camera 140 is an effective (or optimal) position for feeding behavior monitoring and, e.g., move the camera to that position. In other words, the systems can determine that the camera 140 has been calibrated successfully. The count of pellets 132 can be, e.g., 10 pellets per frame, and the count of pellets 132 in a frame can be determined in any appropriate manner. In one example, an object detection algorithm having any appropriate neural network architecture can be used. A few examples include: MobileNet, RetinaNet, and SpineNet.

In some implementations, the camera calibration system 100 can include a second, different, camera that can be, e.g., movable in a similar way as the first camera 140, or fixed at a particular location in the enclosure 110. In one example, the second camera can be positioned above the feeding system 131. The second camera can be the same, or different, type of camera from the first camera 140, and can be configured to capture an image of a scene. In such implementations, the threshold of pellet count per frame can be specified as an aggregate of a first count of pellets 132 per frame detected in the image of the scene obtained by the first camera 140, and a second count of pellets 132 per frame detected in the image of the scene obtained by the second, different, camera.

Generally, it may be desirable to not only calibrate the camera 140, but to also do so in an efficient manner. In one example, the system may operate in an open loop mode, e.g., when the rate of feed delivered to the fish is not regulated based on perception. Accordingly, it may be desirable to calibrate the camera 140 as efficiently as possible so as to avoid wasting feed. In order to facilitate an efficient calibration process, the systems described in this specification can determine a calibration state of the camera 140 and perform a particular sequence of calibration steps associated with that state. The calibration states can include, e.g., three different states: a warm calibration state (illustrated in FIG. 1), a fast-full calibration state (illustrated in FIG. 2), and a slow-full calibration state (illustrated in FIG. 3).

The sequence of steps associated with the warm calibration state may be more efficient in calibrating the camera 140 than the sequence of steps associated with the other states. Accordingly, the systems described in this specification may increase the efficiency of calibrating the camera 140 by, e.g., performing the more efficient warm calibration sequence of steps first, while also maximizing the likelihood of calibrating the camera at all by sequentially performing the fast-full and the slow-full sequence of calibration steps, if it is determined that the warm full calibration sequence of steps was unsuccessful in calibrating the camera 140, as will be described in more detail next.

As shown in FIG. 1, when the camera 140 is positioned at a first position (e.g., at a position that is far removed from the location of the pellets 132), the image of the scene obtained by the camera 140 may not contain any pellets 132 and therefore it may be difficult to discern details relating to the feeding behavior of the fish 120. In other words, the camera 140 may be initially uncalibrated. Accordingly, the systems described in this specification can receive a request to calibrate the camera 140, e.g., to find a position of the camera 140 where the count of pellets 132 per frame is above a particular threshold. In response to the request, the systems described in this specification can determine the calibration state of the camera 140 as a warm calibration state, determine a corresponding sequence of calibration steps, and execute the steps to calibrate the camera 140.

The sequence of steps associated with the warm calibration state can include determining an estimated calibration position. For example, the systems can make a first estimate of a position where the count of pellets 132 per frame in the image of the scene obtained by the camera 140 is above a particular threshold. The estimate can depend on multiple factors such as, e.g., previous known calibration position, weather conditions, the type of feeding system 131 that delivers the pellets 132 to the fish 120, or any other appropriate factor. Based on the estimated calibration position of the camera 140, the systems can determine a first range (e.g., winch distance) for moving the camera 140. For example, as illustrated in the plot 150a in FIG. 1, if the estimated calibration position (winch position) is located at, e.g., 17.5 meters, then the systems can determine the first range to be 15 meters to 19 meters. Generally, in the warm calibration state, the first range can be determined by adding to, or subtracting from, the estimated calibration position approximately 1, 2, or 3 meters. Furthermore, in the warm calibration state, the camera 140 can be moved across the first range over approximately 5 minutes. However, these values of position, distance, and time, are described for illustrative purposes only, and these parameters can include any other appropriate values.

In the warm calibration state, after determining the first range based on the estimated calibration position, the winch controller 103 can engage the motor to move the winch line 105, and the camera 140, across the first range (e.g., from 15 meters to 19 meters) at a speed A, while the camera 140 captures one or more images of the scene. Based on the image of the scene, the systems described in this specification can determine whether the feed delivered to the fish 120 by the feeding system 131 is above a particular threshold. As shown in the plot 150a, the systems can determine a count of pellets 132 per frame obtained by the camera 140.

If the systems determine that the count of pellets 132 per frame is above the threshold for a particular frame, the systems can move the camera 140 to the corresponding winch position where the camera 140 obtained the respective frame, and determine that the camera 140 has been calibrated successfully. For example, if the systems determine that at the winch position of, e.g., 17 meters, the count of pellets 132 per frame is above the threshold, the systems can move the camera to the respective position. However, if the systems determine that the count of feed 132 is below the threshold for all the frames captured by the camera 140 across the range (e.g., from 15 meters to 19 meters), the systems can proceed by determining a new calibration state of the camera 140, e.g., a fast-full calibration state having a different sequence of calibration steps, as will be described in more detail below with reference to FIG. 2.

As described above, in the warm calibration state, the first range can be determined based on the estimated calibration position of the camera 140, and the camera 140 can be moved across the first range relatively quickly, e.g., over approximately 5 minutes. If the sequence of calibration steps associated with the warm calibration state is unsuccessful in calibrating the camera 140, then the systems described in this specification may increase the range over which the camera 140 is moved, because it may have a higher likelihood of detecting a pellet count above the threshold, finding the appropriate calibration position and thereby calibrating the camera 140.

Figure 2:
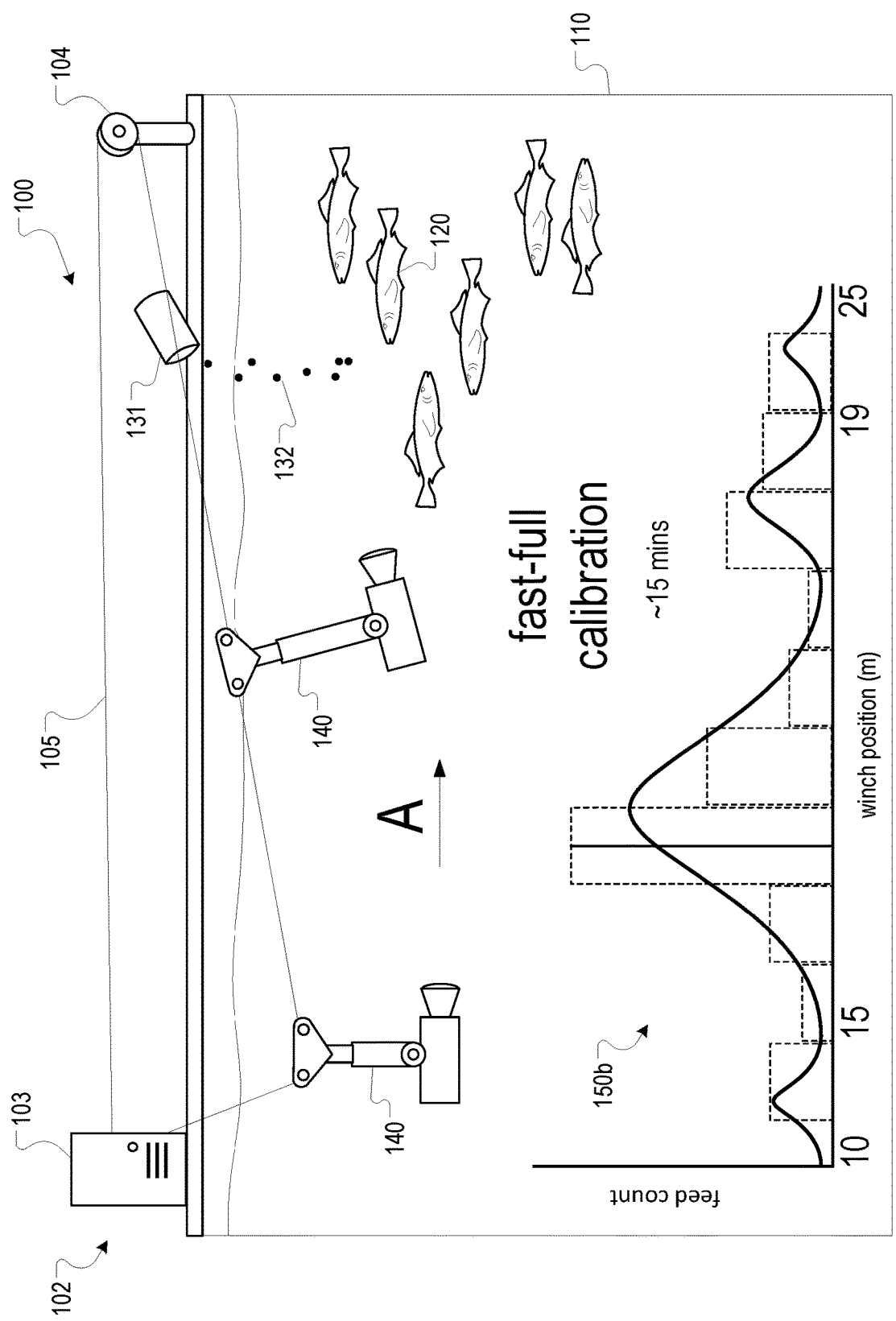
FIG. 2 illustrates an example of calibrating a camera in a fast-full calibration state.

As illustrated in the plot 150*b* in FIG. 2, in the fast-full calibration state, the systems described in this specification can perform a similar sequence of calibration steps as described above with reference to FIG. 1 for the warm calibration state, but with the difference of moving the camera across a second range that is larger than the first range. Specifically, the systems can determine the second range (e.g., 10 to 25 meters) based on the first range (e.g., 15 to 19 meters). For example, the systems can add to/subtract from the first range approximately 5 or more meters, to determine the second range. These values are described for illustrative purposes only, and the second range can include any other appropriate values.

After determining the second range based on the first range, the winch controller 103 can engage the motor to move the winch line 105, and the camera 140, across the second range (e.g., from 10 meters to 25 meters) at a speed A (e.g., the same, or substantially similar, speed as for the warm calibration state) over, e.g., approximately 15 minutes, while the camera 140 captures one or more images of the scene. Based on the image of the scene, the systems described in this specification can determine whether the feed delivered to the fish 120 by the feeding system 131 is above a particular threshold. As shown in the plot 150*b*, the systems can determine a count of pellets 132 per frame obtained by the camera 140, in a similar way as described above for the warm calibration state.

If the systems determine that the count of pellets 132 per frame is above the threshold for a particular frame, the systems can move the camera 140 to the corresponding winch position where the camera 140 obtained the respective frame, and determine that the camera 140 has been calibrated successfully. However, if the systems determine that the count of feed 132 is below the threshold, the systems can proceed by determining a new calibration state of the camera 140, e.g., a slow-full calibration state having a different sequence of calibration steps, as will be described in more detail below with reference to FIG. 3.

As described above, in the fast-full calibration state, the second range can be determined based on the first range (e.g., the first range determined for the warm calibration state), and the camera 140 can be moved across the second range relatively quickly, e.g., over approximately 15 minutes. If the sequence of calibration steps associated with the fast-full calibration state is unsuccessful in calibrating the camera 140, then the systems described in this specification can decrease the speed (e.g., increase the time) over which the camera 140 is moved across the second range, because it may have a higher likelihood of detecting pellets per frame that is above the threshold, finding the appropriate calibration position and thereby calibrating the camera 140.

Figure 3:
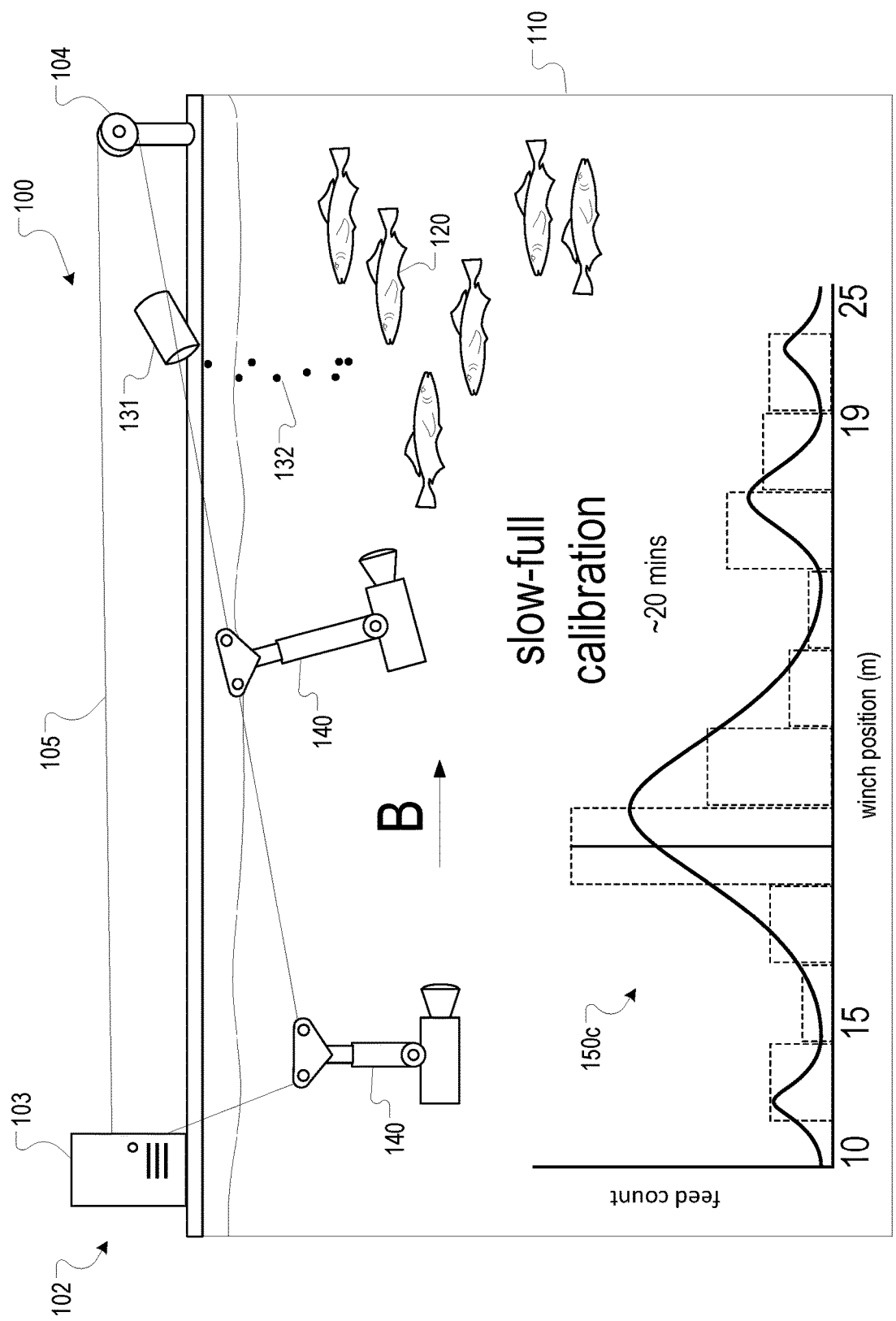
FIG. 3 illustrates an example of calibrating a camera in a slow-full calibration state.

As illustrated in the plot 150*c* in FIG. 3, in the slow-full calibration state, the systems described in this specification can perform a similar sequence of calibration steps as described above with reference to FIG. 2 for the fast-full calibration state, but with the difference of moving the camera across the second range (e.g., approximately the same range as for the fast-full calibration state of 10 to 25 meters) over approximately 20 minutes and at a speed B, slower than the speed A (e.g., slower than the speed for the warm and fast-full calibration states). These values are described for illustrative purposes only, and the time/speed over which the camera 140 is moved can have any other appropriate values.

As shown in the plot 150*c*, the systems can determine a count of the feed 132 per frame obtained by the camera 140 while the camera is moved across the second range at the second (e.g., slower) speed. If the systems determine that the count of feed 132 per frame is above the threshold for a particular frame, the systems can move the camera 140 to the corresponding winch position where the camera 140 obtained the respective frame, and determine that the camera 140 has been calibrated successfully. However, if the systems determine that the count of feed 132 is below the threshold, the systems can terminate the calibration process. In some implementations, the systems can return to the warm calibration state (e.g., described above with reference to FIG. 1), determine a new estimated calibration position, and proceed with the calibration process.

After the systems determine that the camera 140 has been calibrated successfully, the feeding system 131 can deliver main feed 132 to the aquaculture 120, and the camera 140 can effectively observe the feeding behavior. An example of a camera calibration system that can be used to calibrate the camera 140 will be described in more detail next with reference to FIG. 4.

Figure 4:
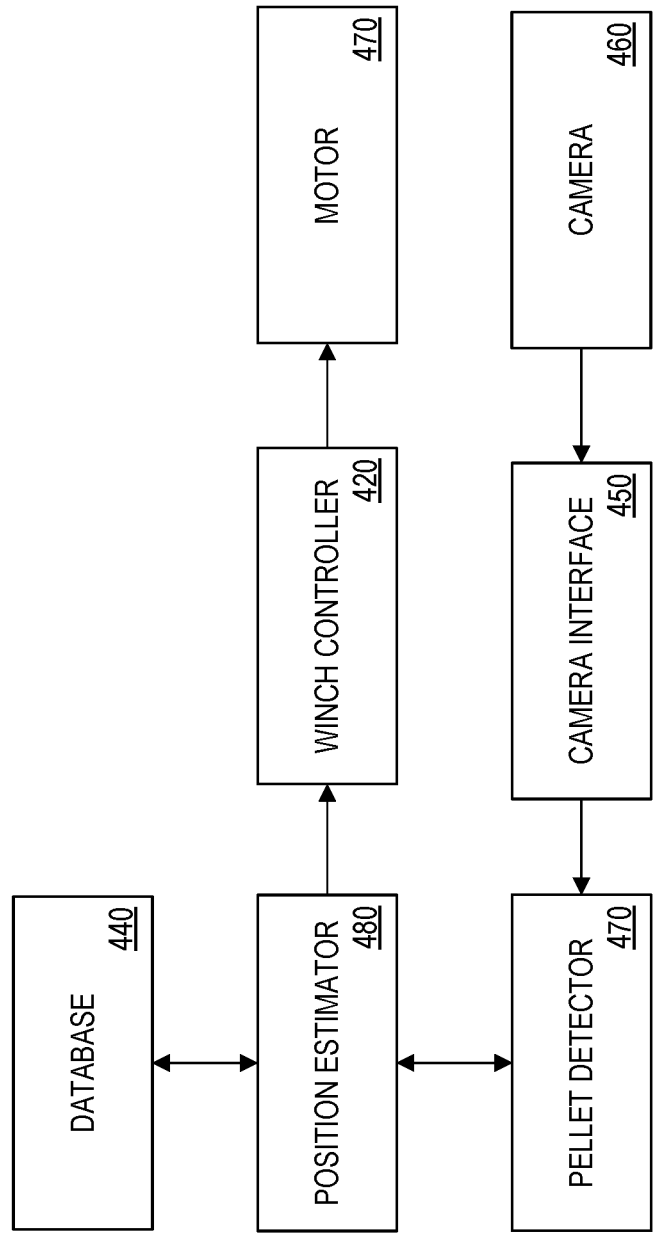
FIG. 4 is a block diagram of an example system for performing the operations according to the implementations of the present disclosure.

FIG. 4 is an example system 400 for performing the operations according to the implementations of the present disclosure. The system 400 can be implemented by a combination of hardware, software, and firmware.

The system 400 can include a camera 460 for capturing image and video data (e.g., an image of a scene, as described above with reference to FIGS. 1, 2, and 3). In place of the camera 460, any device, or combination of devices, that are capable of generating image and video data can be used. The system 400 further includes a camera interface 450 communicatively coupled to the camera 460. The camera interface 450 can receive image and video data from the camera 460 and provide it as an input to other components of the system 400.

The system 400 further includes a pellet detector 470 communicatively coupled to the camera interface 450. The pellet detector 470 can determine a pellet count per frame obtained by the camera 460 and thereby determine whether a feed delivered to an aquaculture by a feeding system is above a threshold (e.g., as described above with reference to FIGS. 1, 2, and 3). The system 400 can further include a database 440 communicatively coupled to a position estimator 480. The database 440 can store information about different calibration states (e.g., warm, fast-full, and slow-full, as described with reference to FIGS. 1, 2, and 3, respectively), and associated sequences of calibration steps (e.g., instructions for performing the calibration steps). The database 440 can further include information about previous calibration positions of the camera 460, and the current absolute position of the camera 460. The absolute position of the camera can be determined by e.g., obtaining data from a GPS attached to the camera 460, measuring a length of a winch line that is coupled to the camera 460 and spooled out from a winch, or any other suitable means.

The information in the database 440, and the information from the pellet detector 470, can be used by the position estimator 480 to determine, e.g., a calibration state of the camera 460, the sequence of steps associated with the calibration state of the camera 460, a first range for moving the camera 460 (e.g., the first range associated with the warm calibration state), a second range for moving the camera (e.g., the second range associated with the fast-full and slow-full calibration states), speed/time over which the camera 460 should be moved, and whether the camera 460 has been calibrated successfully.

The position estimator 480 can provide a command to the winch controller 420 to move the camera from a first position to a second position, e.g., across a particular range, at a particular speed, in accordance with the particular calibration state determined by the position estimator 480. The winch controller 420, in turn, can operate the motor 470 to move the camera 460, in a similar way as described above with reference to FIGS. 1, 2, and 3, while the camera 460 obtains an image of a scene.

Further, the position estimator 480 can dynamically determine whether the count of pellets per frame obtained by the camera 460 is above a particular threshold. For example, the camera 460 can continuously generate image and video data as it is being moved across a particular range by the motor 470 and provide the data to the pellet detector 470 that can iteratively estimate the count of pellets per frame. At each iteration, the pellet detector 470 can provide the pellets per frame count to the position estimator 480 that can determine whether the count is above the threshold. If the position estimator 480 determines that the count is above the threshold (e.g., the camera 460 has been calibrated successfully), it can provide a command to the winch controller 420 that can, in turn, engage the motor 470 to stop moving the camera 460, such that the camera 460 remains at the calibration position that is effective for observing feeding behavior monitoring, as determined by the position estimator 480.

In this way, the system 400 can dynamically evaluate whether the camera 460 is located at the calibration position, and adjust the position of the camera 460 accordingly, in order to compensate for environmental effects such as e.g., drift of a feeding system that delivers the camera, drift of pellets underwater, etc., due to, e.g., wind, or strong ocean currents. This, in turn, enables the system 400 to facilitate dynamic calibration of the camera 460 for effective feeding behavior monitoring, under variable weather conditions.

Figure 5:
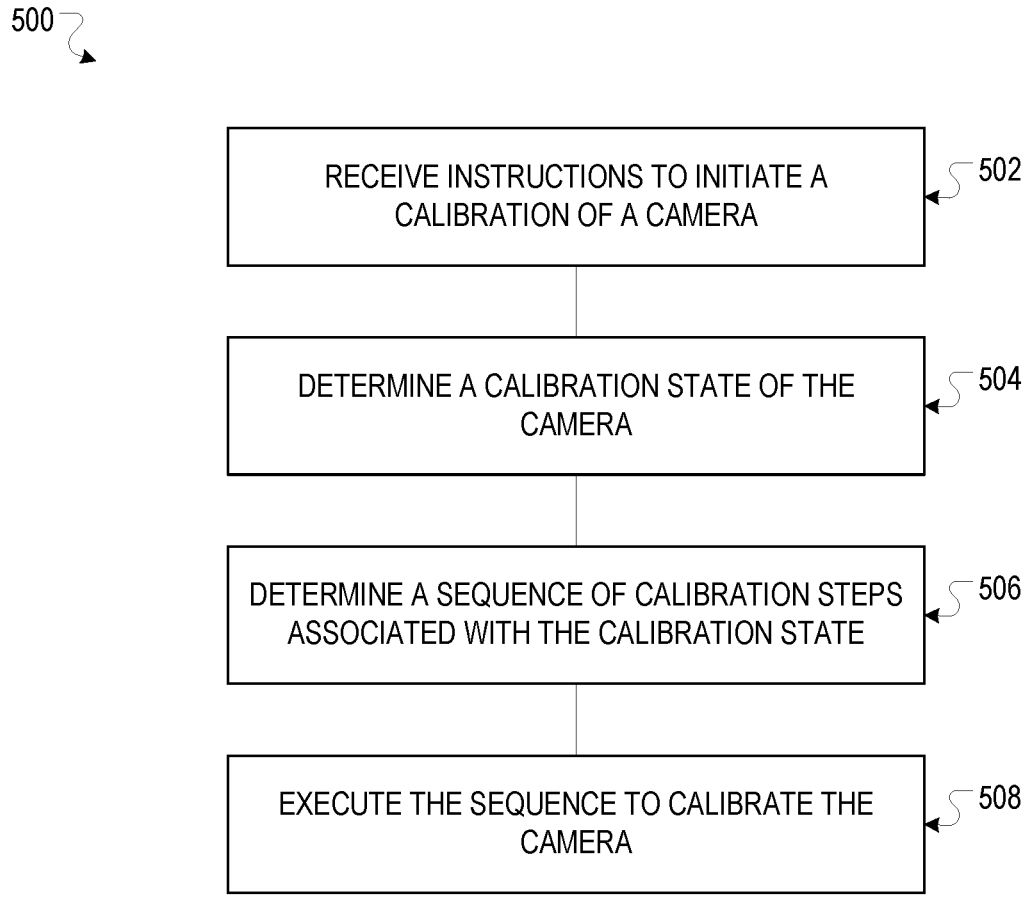
FIG. 5 is a flow diagram of an example process that can be executed in accordance with implementations of the present disclosure.

FIG. 5 depicts an example process 500 that can be executed in accordance with the implementations of the present disclosure. In some implementations, the example process 500 can be performed using one or more computer-executable programs executed using one or more computing devices. The process 500 can be performed by the system 400 depicted in FIG. 4.

The system receives, by a control system, instructions to initiate a calibration of a first camera (502). The control system can include the first camera that can obtain an image of a scene, a winch controller, and a feeding system that can deliver a feed (e.g., feeding pellets) to aquaculture (e.g., fish). The system determines a calibration state of the first camera (504). The system determines a sequence of calibration steps based on the calibration state of the first camera (506). Further, the system executes the sequence of calibration steps to calibrate the first camera (508).

The calibration state can be a warm calibration state, a fast-full calibration state, or a slow-full calibration state, e.g., as described above with reference to FIGS. 1, 2, and 3, respectively. Each of the calibration states can have an associated sequence of calibration steps for calibrating the camera. In some implementations, if the camera is initially uncalibrated, the calibration state determined by the system can be the warm calibration state.

The sequence of calibration steps associated with the warm calibration state (e.g., as illustrated in FIG. 1) can include determining an estimated calibration position, e.g., previous calibration position of the camera, determining a first range based on the estimated calibration position, moving, by the winch controller, the first camera across the first range at a first speed, obtaining, by the first camera, the image of the scene, and determining, based on the image of the scene obtained by the first camera, whether the feed delivered by the feeding system is above a threshold. In some implementations, the system can determine based on the image of the scene obtained by the first camera that the feed delivered by the feeding system is above the threshold and that the first camera is therefore calibrated successfully. In such instances, the feed (e.g., a main meal) can be delivered to the aquaculture and the camera can effectively monitor the associated feeding behavior.

However, in some implementations, the system can determine from the image of the scene obtained by the first camera that the feed delivered by the feeding system is below the threshold. Accordingly, the system can determine that the calibration state is a fast-full calibration state, e.g., the system can proceed to executing a different sequence of calibration steps.

The sequence of calibration steps associated with the fast-full calibration state (e.g., as illustrated in FIG. 2) can include determining a second range based on the first range (e.g., based on the range determined for the warm calibration state), where the second range is larger than the first range, moving, by the winch controller, the first camera across the second range at the first speed (e.g., a speed that is substantially similar to, or the same as, the speed for the warm calibration state), obtaining, by the first camera, the image of the scene, and determining, based on the image of the scene obtained by the first camera, whether the feed delivered by the feeding system is above the threshold. Similarly to the warm calibration state, in the fast-full calibration state the system can determine based on the image of the scene obtained by the first camera that the feed delivered by the feeding system is above the threshold, and thereby determine that the first camera is calibrated successfully. As described above, in such instances, the feed (e.g., a main meal) can be delivered to the aquaculture and the camera can effectively monitor the associated feeding behavior.

However, in some implementations, the system can determine, from the image of the scene obtained by the first camera, that the feed delivered by the feeding system is below the threshold. Accordingly, the system can determine that the calibration state is a slow-full calibration state, e.g., the system can proceed to executing yet another, different, sequence of calibration steps.

The sequence of steps associated with the slow-full calibration state (e.g., as illustrated in FIG. 3) can include moving, by the winch controller, the first camera across the second range (e.g., the range that is substantially similar to, or the same as, the range for the fast-full calibration state) at a second speed, where the second speed is slower than the first speed (e.g., substantially slower than the speed for the warm and fast-full calibration states), obtaining, by the first camera, the image of the scene, and determining, based on the image of the scene obtained by the first camera, whether the feed delivered by the feeding system is above the threshold. Similarly to the warm calibration state and the fast-full calibration state, in the slow-full calibration state the system can determine based on the image of the scene obtained by the first camera that the feed delivered by the feeding system is above the threshold, and thereby determine that the first camera is calibrated successfully. As described above, in such instances, the feed (e.g., a main meal) can be delivered to the aquaculture and the camera can effectively monitor the associated feeding behavior.

If the system determines from the image of the scene obtained by the first camera, that the feed delivered by the feeding system is below the threshold in the slow-full calibration state, the system can, e.g., determine that the camera is uncalibrated and terminate the calibration process, or the system can, e.g., determine that the camera is uncalibrated, return to the warm calibration state and perform the associated sequence of calibration steps again, which may then be followed by the sequences of calibration steps associated with the fast-full and the slow-full calibration states, in a similar way as described above.

In some implementations, the image of the scene obtained by the first camera can include at least one frame, and the threshold can specify a count of the feed detected in the at least one frame. In some implementations, the control system can include a second camera that can obtain the image of the scene, and the threshold can specify an aggregate of a first count of feed detected in the image of the scene obtained by the first camera and a second count of feed detected in the image of the scene obtained by the second camera.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

The invention claimed is:
1. A method comprising:
receiving, by a control system that includes (i) a first camera that is initially uncalibrated and that is configured to obtain an image of a scene, (ii) a winch controller, and (iii) a feeding system configured to deliver a feed to aquaculture, instructions to initiate a calibration of the first camera;

selecting a warm calibration state for the first camera;

determining a sequence of calibration steps based on the selected state for the first camera; and executing the sequence of calibration steps to calibrate the first camera, comprising:
- determining an estimated calibration position;
- determining a first range based on the estimated calibration position;
- moving, by the winch controller, the first camera across the first range at a first speed;
- obtaining, by the first camera, the image of the scene; and
- determining, based on the image of the scene obtained by the first camera, whether the feed delivered by the feeding system is above a threshold.

2. The method of claim 1, wherein the image of the scene obtained by the first camera includes at least one frame, and wherein the threshold specifies a count of the feed detected in the at least one frame.

3. The method of claim 1, wherein the control system further includes a second camera configured to obtain the image of the scene, and wherein the threshold specifies an aggregate of (i) a first count of feed detected in the image of the scene obtained by the first camera and (ii) a second count of feed detected in the image of the scene obtained by the second camera.

4. The method of claim 1, further comprising:
determining based on the image of the scene obtained by the first camera that the feed delivered by the feeding system is above the threshold; and
determining that the first camera is calibrated successfully.

5. The method of claim 1, further comprising:
determining, from the image of the scene obtained by the first camera that the feed delivered by the feeding system is below the threshold; and
selecting a different calibration state for the first camera.

6. A method comprising:
receiving, by a control system that includes (i) a first camera configured to obtain an image of a scene, (ii) a winch controller, and (iii) a feeding system configured to deliver a feed to aquaculture, instructions to initiate a calibration of the first camera;

selecting a fast full calibration state for the first camera;

determining a sequence of calibration steps based on the selected state for the first camera; and executing the sequence of calibration steps to calibrate the first camera, comprising:
- determining a second range based on a first range associated with a warm calibration state, wherein the second range is larger than the first range;
- moving, by the winch controller, the first camera across the second range at a first speed;
- obtaining, by the first camera, the image of the scene; and
- determining, based on the image of the scene obtained by the first camera, whether the feed delivered by the feeding system is above a threshold.

7. The method of claim 6, further comprising:
determining based on the image of the scene obtained by the first camera that the feed delivered by the feeding system is above the threshold; and
determining that the first camera is calibrated successfully.

8. The method of claim 6, further comprising:
determining, from the image of the scene obtained by the first camera, that the feed delivered by the feeding system is below the threshold; and
selecting a different calibration state for the first camera.

9. A method comprising:
receiving, by a control system that includes (i) a first camera configured to obtain an image of a scene, (ii) a winch controller, and (iii) a feeding system configured to deliver a feed to aquaculture, instructions to initiate a calibration of the first camera;

selecting a slow full calibration state for the first camera;

determining a sequence of calibration steps based on the selected state for the first camera; and executing the sequence of calibration steps to calibrate the first camera, comprising:
- moving, by the winch controller, the first camera across a second range at a second speed, wherein the second range is associated with a fast-full calibration state, and wherein the second speed is slower than a first speed associated with the fast-full calibration state;
- obtaining, by the first camera, the image of the scene; and
- determining, based on the image of the scene obtained by the first camera, whether the feed delivered by the feeding system is above a threshold.

10. The method of claim 9, further comprising:
determining based on the image of the scene obtained by the first camera that the feed delivered by the feeding system is above the threshold; and
determining that the first camera is calibrated successfully.

11. One or more non-transitory computer-readable storage medium coupled to one or more processors that, when executed by the one or more processors, cause the one or more processors to perform operations comprising:
receiving, by a control system that includes (i) a first camera that is initially uncalibrated and that is configured to obtain an image of a scene, (ii) a winch controller, and (iii) a feeding system configured to deliver a feed to aquaculture, instructions to initiate a calibration of the first camera;

selecting a warm calibration state for the first camera;

determining a sequence of calibration steps based on the selected state for the first camera; and executing the sequence of calibration steps to calibrate the first camera, comprising:
- determining an estimated calibration position;
- determining a first range based on the estimated calibration position;
- moving, by the winch controller, the first camera across the first range at a first speed;
- obtaining, by the first camera, the image of the scene; and
- determining, based on the image of the scene obtained by the first camera, whether the feed delivered by the feeding system is above a threshold.

12. The one or more non-transitory computer-readable storage medium of claim 11, wherein the image of the scene obtained by the first camera includes at least one frame, and wherein the threshold specifies a count of the feed detected in the at least one frame.

13. The one or more non-transitory computer-readable storage medium of claim 11, wherein the control system further includes a second camera configured to obtain the image of the scene, and wherein the threshold specifies an aggregate of (i) a first count of feed detected in the image of the scene obtained by the first camera and (ii) a second count of feed detected in the image of the scene obtained by the second camera.

14. A control system comprising:
   a first camera that is initially uncalibrated and that is configured to obtain an image of a scene;
   a winch controller;
   a feeding system configured to deliver a feed to aquaculture;
   one or more computers; and
   one or more storage devices storing instructions that are operable, when executed by the one or more computers, to cause the one or more computers to perform operations comprising:
   receiving instructions to initiate a calibration of the first camera;
   selecting a warm calibration state for the first camera;
   determining a sequence of calibration steps based on the selected state for the first camera; and
   executing the sequence of calibration steps to calibrate the first camera, comprising:
      determining an estimated calibration position;
      determining a first range based on the estimated calibration position;
      moving, by the winch controller, the first camera across the first range at a first speed;
      obtaining, by the first camera, the image of the scene; and
      determining, based on the image of the scene obtained by the first camera, whether the feed delivered by the feeding system is above a threshold.

* * * * *